United States Patent [19]

Andrews et al.

[11] 3,831,499

[45] Aug. 27, 1974

[54] GAS PUMP EMPLOYING ELECTRON BEAM WELDED BELLOWS

[75] Inventors: Arthur J. Andrews, Harwichport, Mass.; Paul J. Luther, Ft. Lauderdale, Fla.

[73] Assignee: Compressive Industries, Inc., Ft. Lauderdale, Fla.

[22] Filed: Aug. 16, 1972

[21] Appl. No.: 281,122

[52] U.S. Cl. .................................................. 92/45
[51] Int. Cl. ......................... F01b 19/00, F16j 3/00
[58] Field of Search ............ 92/34, 45; 219/121 EM

[56] References Cited
UNITED STATES PATENTS

| | | | |
|---|---|---|---|
| 2,084,496 | 6/1937 | Lockwood | 92/45 X |
| 2,347,185 | 4/1944 | Fentress | 92/45 X |
| 2,811,173 | 10/1957 | Benson | 92/45 X |
| 3,182,175 | 5/1965 | Sibley | 219/121 EM X |
| 3,233,632 | 2/1966 | Voitik | 92/45 X |
| 3,277,927 | 10/1966 | Schneider | 92/34 X |

*Primary Examiner*—Edgar W. Geoghegan
*Assistant Examiner*—Abraham Hershkovitz
*Attorney, Agent, or Firm*—Wolf, Greenfield & Sacks

[57] ABSTRACT

A gas compressor/vacuum pump has an electron beam welded bellows defining a compression chamber. The diaphragms of the bellows are welded at lap joints with the joint thicknesses preferably being no more than the thickness of the diaphragms so as to allow full compression of the bellows and thus optimize volumetric output and compression ratio. A method of forming the bellows includes electron beam welding on continuous seam paths to form bellows with highly precise concentricity.

1 Claim, 7 Drawing Figures

PATENTED AUG 27 1974
3,831,499
SHEET 1 OF 2
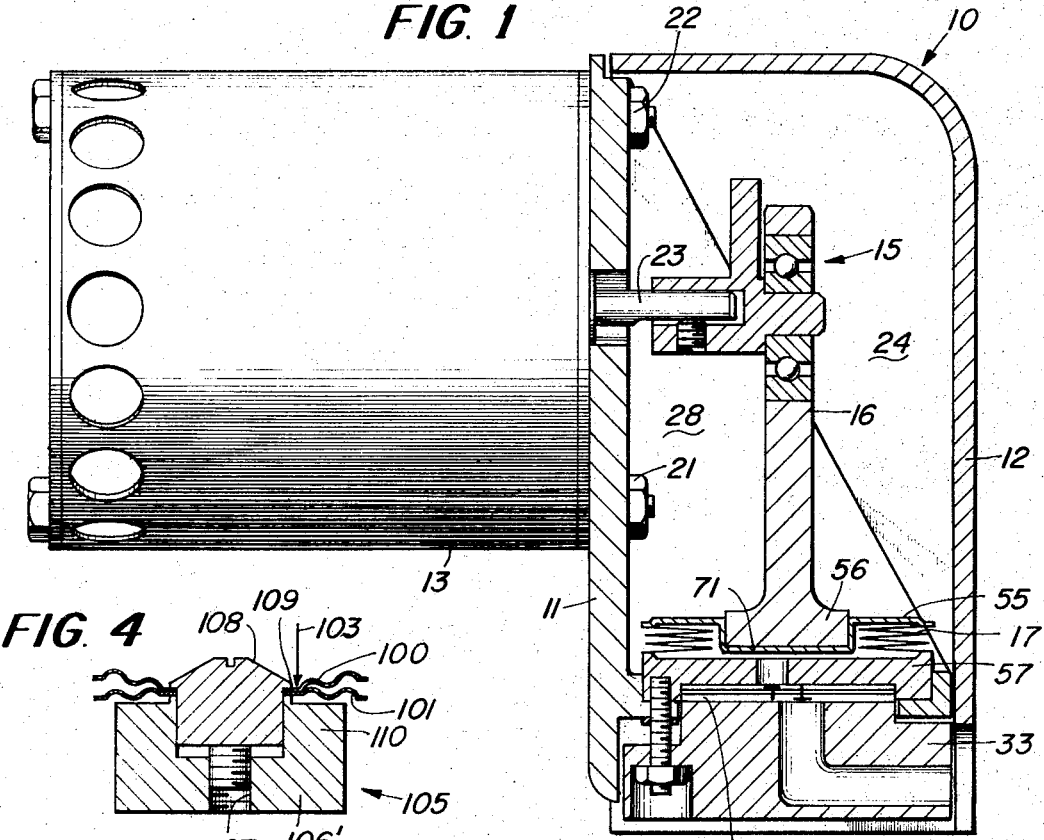
FIG. 1
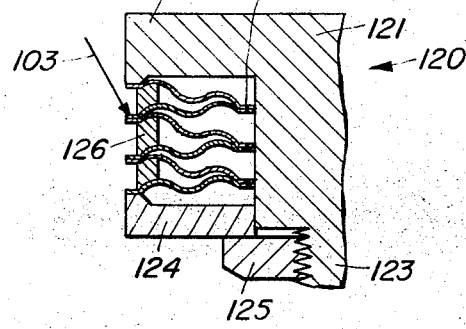
FIG. 4
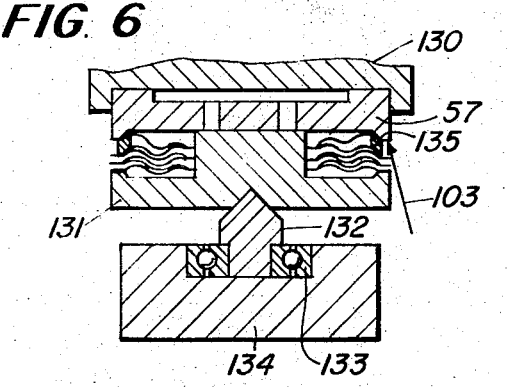
FIG. 5
FIG. 6
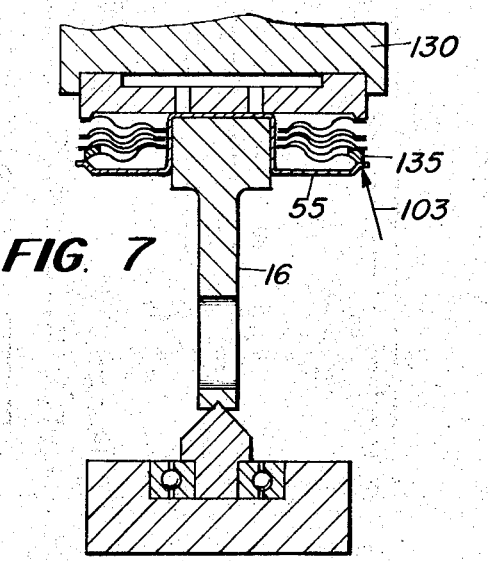
FIG. 7

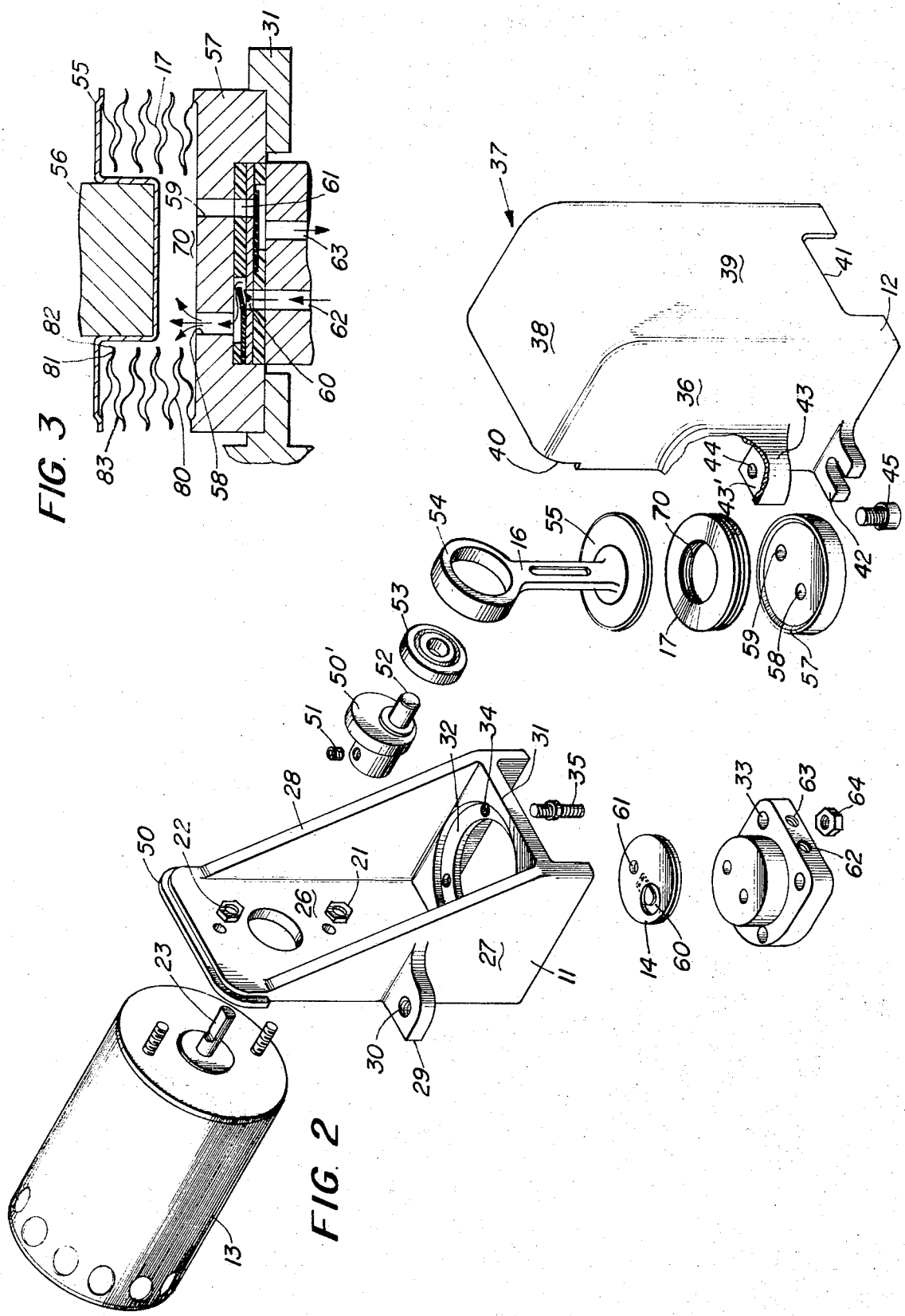

GAS PUMP EMPLOYING ELECTRON BEAM WELDED BELLOWS

BACKGROUND OF THE INVENTION

The need for gas compressor and vacuum pumps having capacities of 0.01 cfm to 12 cfm has multiplied in recent years. Emerging technology in the areas of medical instrumentation, air pollution monitoring and detecting systems, high speed computer systems, food processing and the like have placed tremendous demands on pneumatic systems. Highly reliable operation over long time periods are often required along with ultra-cleanliness. Frequently as in stack gas analysis, pump or compressor materials exposed to the gas stream must be formed of special materials such as high nickel alloys to eliminate corrosion problems.

In the past, classical piston cylinder, rotary vane or elastomer diaphragm-type compressors and pumps have fulfilled the needs of industry. In more recent times, a TIG (tungsten-inert gas) welded bellows vacuum pump or compressor has been marketed as by Metal Bellows Corporation of Sharon, Massachusetts. Such TIG welded bellows pumps have found good reception in the industry. However, the pumps are often limited to specific materials useful in the bellows such as stainless steel alloys. Non-ferrous materials, high nickel alloys and refractory metals cannot readily be welded by the TIG process. Moreover, the TIG welding process often results in large weld beads having greater thickness than the seam thickness of diaphragms of the bellows which result in low compression ratios and reduced efficiency. Difficulties are found in maintaining concentricity of bellows seams when using TIG welding procedures and the lack of concentricity affects useful life and reliability.

SUMMARY OF THE INVENTION

It is an important object of this invention to provide a hermetically sealed gas pump, useful as a gas compressor or vacuum pump, and which has an electron beam welded metal bellows forming the compression chamber of the pump.

It is another object of this invention to provide a method of forming a pump in accordance with the preceding object.

Still another object of this invention is to provide a pump in accordance with the preceding objects which can be formed of a wide variety of materials and which permits uniformity of fabrication with cleanliness of operation at high efficiency and high compression ratios.

Still another object of this invention is to provide a pump in accordance with the preceding objects which has few frictionally rubbing parts, a wide range of operating conditions and a long useful life.

According to the invention, a gas compressor or vacuum pump comprises an electron beam welded bellows defining a compression chamber. A reciprocating means is mounted for compressing and expanding the bellows. A header means is located on the bellows with valve means for permitting passage of gas into and out of the compression chamber. The bellows comprises a plurality of thickened diaphragm walls with the walls defining first and second continuous seams and the seams are hermetically sealed by a weld having a thickness substantially no greater than the thickness of the walls at each seam.

According to the method of this invention, a bellows for use in gas compressors and the like is produced by forming continuous electron beam hermetic welds substantially along an inside diameter of two diaphragm walls at a lapped seam. A second set of diaphragm walls are formed with a corresponding lapped seam. Following this, the walls of the first and second set are joined substantially at an outside diameter by a continuous hermetic electron beam welded lap seam having a thickness no greater than the thickness of the walls joined together.

It is a feature of this invention that the method allows maintenance of good concentricity in metal bellows fabricated in accordance with this invention. Because of the thickness of the seams formed, extremely high efficiency can be obtained in the metal bellows of this invention.

BRIEF DESCRIPTION OF THE DRAWINGS

The above and other objects, features and advantages of the present invention will be better understood from the following specification when read in the light of the accompanying drawings in which:

FIG. 1 is a cross sectional view through the housing of a gas compressor formed in accordance with the preferred embodiment of this invention;

FIG. 2 is an exploded view thereof;

FIG. 3 is a cross sectional view of a detail thereof; and

FIGS. 4–7 are cross sectional views illustrating steps in the method of fabrication of the gas compressor shown in FIGS. 1 and 2.

DESCRIPTION OF PREFERRED EMBODIMENTS

With reference now to the drawings, a preferred embodiment of a gas compressor pump in accordance with this invention is illustrated generally at 10 and comprises a two-part housing 11, 12, a driving motor 13, a valve assembly 14, cam assembly 15, connecting rod 16 for providing reciprocal motion and the novel bellows construction 17 of this invention.

The novel and improved bellows construction 17 will be more fully described in detail after first discussing conventional parts of the compressor pump 10.

Generally, the gas compressor pumps of this invention are preferably formed with compression ratios ranging from 0 to 1 up to 8 to 1 with lengths of stroke of from 0.010 to 2 inches with 0.250 inches preferred. Thickness of bellow leaves or diaphragms preferably range from 0.0005 to 0.030 inch with 0.003 inch being preferred using electric motors having ratings of 1/250 HP to 5 HP with a preferred range of from 1/15 HP to ¼ HP. Pump capacities within these parameters range from 0.01 cfm to 12 cfm with 1.0 cfm in the preferred embodiment operating at pressures in the range of from 0 to 150 psig and preferably 30 psig.

With reference now to FIGS. 1 and 2, the specific construction of the preferred embodiment of a gas compressor pump comprises an electric motor 13 bolted to housing portion 11 by nuts 21 and 22. An axially rotatable motor shaft 23 protrudes into an inner chamber 24 defined by the two housing portions 11 and 12.

Housing portion 11 has a side or rear wall 26 with right angle extending substantially triangular walls 27 and 28 each having an outwardly depending flange as shown at 29 with an internally threaded hole 30. A transverse wall 31 carries a recess 32 for mounting of a lower header 57 with an underlying lower cap 33 as will be described, through suitable mounting holes 34 and locking studs 35. Housing portion 12 is generally rectangular having side walls 36 and 37 with a top wall 38 and a rear wall 39 defining a rectangular opened inside chamber with a side, opposite wall 39, open, to be closed by wall 26 of housing portion 11. An indented ridge 40 is designed to accept a T-shaped top 50 of the housing portion 11. A cutout portion 41 allows passage of suitable conduits into the compressor pump housing. Mounting flanges 42 for mounting to a flat support surface are provided on either side of the housing portion 12. A flange receiving extension 43 is provided with a hole 44 for alignment with hole 30 when the housing portions 11 and 12 are secured together. In use, flange 29 directly overlies flange 43' on either side of the housing and a locking screw 45 is passed through hole 44 and hole 30 to lock the housing portions together. Preferably, a resilient gasket such as a circular disc gasket is positioned between the lower portion of flange 30 and the upper portion of flange 43 in order to provide a resilient connection to the housing although this is not necessarily required. The resilient connection acts as a vibration damper when the pump is in operation.

Shaft 23 carries a cam counterweight member 50' affixed to the shaft 23 for rotation therewith by a set screw 51. Outwardly extending cam shaft 52 has a central axis displaced slightly from the central axis of shaft 23. Shaft 52 is slip fit into the center of a circular bearing assembly 53 which is in turn fixed to a circular end 54 of the connecting rod 16. Thus, rotation of motor shaft 23 causes reciprocal substantially linear up and down movement of the connecting rod 16.

The cylindrical bellows 17 is connected by a hermetic seal at an upper end to an upper rigid metallic header 55 in the form of a disc having a depression interlocked with a circular end 56 of the connecting rod. The lower end of the bellows 17 is connected by a continuous circular hermetic seal to a lower rigid metallic bellows header 57 which has a plurality of through ports 58, 59 aligned with a valve assembly 14 carrying conventional one-way reed valves 60, 61 and which is in turn locked to the lower cap 33 having outlet passageways 62 and 63 passing therethrough. The lower cap 33 is attached to the shelf portion 31 by the locking studs 35 and suitable nuts such as 64 in the arrangement generally shown in FIG. 1.

The valve assembly 14 basically comprises two one-way reed valves 60 and 61 in a conventional form such as having a metal disc with an underlying and overlying teflon sheet valve member so that there is formed intake and exhaust port disc reeds for intake and exhaust from the comptession chamber 70 of the bellows 17.

The compressor pump 17 has at its heart, the compression chamber 70 formed by the bellows 17. Bellows 17 is formed of thin diaphragm walls such as stainless steel leaves or discs 80 joined by successive lapped seams 81 slightly spaced from each inner diameter 82 and lapped seams 83 slightly spaced from each outer diameter. The diaphragms of the preferred embodiment are formed of thin stainless steel no. AM350 having a thickness of 0.003 inch with an inside diameter of 1.000 inch and an outside diameter of 2.000 inch and with seams 81 and 83 located 0.045 inch from the respective inside and outside diameters. The bellows has an over-all length when compressed of 0.200 inches and an over-all top to bottom length when expanded of 0.600 inches. Since the seams 81 and 83 are formed by electron beam welding, such seams have a thickness no greater than the thickness of the two diaphragms which each seam joins together. For example, when the adjacent diaphragm walls have a total thickness of 0.006 inch in the preferred embodiment, the seam thickness is 0.006 inch. This is unlike the prior art TIG welded bellows where the seams are formed by bead welds typically having thicknesses greater than the combined thickness of the two diaphragms which they join together.

An example of the increased efficiency of the bellows of this invention is illustrated by the following discussion. With a diaphragm wall thickness of 0.003 inch for each diaphragm, a TIG weld is typically 0.011 inch in thickness while in the preferred embodiment, the electron beam weld has a maximum thickness of 0.006 inch. Thus, with an uncompressed length of 0.600 inch in each diaphragm bellows such as bellows 17 and a similarly formed TIG welded bellows, when fully compressed, the TIG welded diaphragm cannot compress to more than 0.360 inch while the bellows of this invention can compress to 0.200 inch. By applying the standard formula for volumetric output, i.e., effective area in square inch $x$ the stroke (difference between uncompressed length and fully compressed length) $x$ rpm (speed of the driving motor), it is easy to see how the efficiency of the present bellows is greater than the efficiency of the best prior art known bellows. In the present case, with an effective area of 1.75 inches, a stroke of 0.400 inch and an rpm of 3,000, volumetric output is 2,100 cubic inches per minute while with a TIG welded bellows having an effective area of 1.75 inches, a stroke of 0.240 inch (no greater is permitted in the example because of the weld bead thicknesses), and an rpm of 3,000, volumetric output is only 1,260 cubic inches per minute.

The operation of the compressor pump 10 is as known in the art. Thus, the motor is actuated causing the shaft 52 to reciprocate the piston 16 in an up and down direction thus alternately expanding and contracting the bellows 17 as known in the art. FIG. 1 shows the bellows just slightly before complete contraction. In actuality, when the piston 16 is at its lowermost point of the compression stroke, the diaphragm walls are substantially adjacent each other and form a substantially solid mass between the upper header 55 and lower header 57. When the piston 16 is at its lowermost point, the central disc area 71 of the upper header is adjacent the central portion of the lower header 57 and the chamber 70 substantially evacuated. The intake valve 60 is connected to the atmosphere when air is to be compressed and the discharge valve 61 is connected through port 63 to an area to receive the compressed gas. During each stroke of the connecting rod 16, as the header 55 moves upward from its lowermost position, the volume of the compression chamber 70 increases with a subsequent decrease in air pressure. When a predetermined point is reached in the course of the upward stroke, the compression chamber pressure drops below the inlet pressure so that the inlet valve 60 automatically opens allowing air to flow into the chamber until the end of the stroke of the upward movement of the connecting rod whereupon the connecting rod starts to move down, both valves 60 and 61 are closed until a predetermined pressure is reached in the compression chamber 70 whereupon valve 61 opens and compressed gas is forced out through passageway 62. When the header 55 again reaches its lowermost position, both valves are closed and the cycle is repeated during the next stroke of the connecting rod 16. Because of the use of lap welded seams having a thickness no greater than the thickness of the diaphragm walls, the ratio between the uncompressed and fully compressed bellows is maximized to allow maximum efficiency as previously described.

Thus, as seen from the above discussion, it is important to the effectiveness of the compressor pump, that the lapped seams be formed with the desired maximum thickness being the thickness of the diaphragm walls. Another important factor in the effectiveness and long life of the pumps is the ability to form the seams with high concentricity to each other.

The electron beam welding machines useful in this invention to form the bellows 17 can be any of the known electron beam welding machines although the Hamilton Standard Corporation W2 Model Unit is preferred. Such units utilize the energy of a beam of rapidly moving electrons to create intense heat which melts the metal of the bellows diaphragms and the stirring action of the impinging electrons mix and fuse the materials. Such electron beam welding machines basically consist of an electron gun and focusing system with a work chamber. The work chambers useful in this invention are preferably operated at hard vacuums of $1 \times 10^{-4}$ mmHg or greater. A standard Hamilton Standard Corporation Model NO. W2 machine utilizing a Steigerwald self-accelerating triode system having a filament, a cathode cup and a corona ring with anode pin are preferably used. Preferably the filament is formed of 0.012 inch diameter tungsten wire. The optical system is preferably altered to include a high power (20–30X magnification) widefield viewer.

The welding parameters for each thickness and type material used can vary greatly and in all cases it is desired to maximize hermetic welding depending upon the material used. Preferred parameters for specific diaphragm materials when using the Hamilton Standard W2 are indicated below in the following tables:

| High nickel alloys and copper — | Beam Current +10% Speed reduced by 75% |
| Aluminum — | speed increased by 50 percent |
| Refractory metals — | KV and beam current are increased. |

Preferably, general electron beam welding parameters for various materials lie in the following ranges:

| accelerating voltage— | 30 KV to 150 KV |
| Beam current— | .12 MA to 1.0 MA |
| speed of rotation of fixture— | 30"/Min. to 180"/Min. |
| Focus of electron beam— | (− .050") to (+ .050") below mat'l surface / above mat'l surface |
| Filament current— | PEAK |

It is preferred to use tooling which allows for low T.I.R. in the seams of the bellows 17 as for example less than 0.001 total indicator runout. Preferred fixtures for achieving high concentricity bellows with less than 0.001 T.I.R. are described below with reference to FIGS. 4–7.

Generally, the diaphragm walls such as 100 and 101 are first formed either in flat hollow disc shape or with undulations therein as shown in the preferred embodiment. The circular undulations are as known in the art to decrease metal fatigue in the bellows. The preferred embodiment is in the form of a conventional Neuter diaphragm which has no pitch. It is preferred to first form inside seams 81 on pairs of walls 100, 101 after which walls 100, 101 of adjacent pairs are joined to each other by outside seams 83 to form the bellows 17. In all cases, the electron beam used, which is represented by arrow 103 in FIGS. 4–7, is preferably a substantially thin line having a fixed position with the work parts (diaphragm walls) rotated to form highly concentric seams. The inner and outer diameters of each diaphragm wall can be formed with high concentricity by known punching operations. The punched edges provide for mounting on the fixtures used with accurate

ELECTRON BEAM WELDING PARAMETERS FOR STAINLESS STEEL DIAPHRAGMS

| I. D. Welds | Diaphragm Thickness | | | |
| --- | --- | --- | --- | --- |
| | .001 | .003 | .005 | .010 |
| Accelerating Voltage | 40 KV | 47 KV | 60 KV | 80 KV |
| Beam Current | .15 MA | .18 MA | .30 MA | .50 MA |
| Speed of Rotation of fixture | 100"/Min. | 100"/Min. | 100"/Min. | 150"/Min. |
| Focus of electron beam | + .030" | + .030" | + .030" | + .030" |
| Filament Current | PEAK | PEAK | PEAK | PEAK |
| O. D. Welds | .001 | .003 | .005 | .010 |
| Accelerating Voltage | 100 KV | 120 KV | 150 KV | 150 KV |
| Beam Current | .12 MA | .15 MA | .20 MA | .35 MA |
| Speed of Rotation of fixture | 50"/Min. | 50"/Min. | 50"/Min. | 50"/Min. |
| Focus of electron beam | − .020" | − .020" | − .020" | − .010" |
| Filament Current | PEAK | PEAK | PEAK | PEAK | turning about the central axis of the punched edges possible so as to obtain high concentricity in the welds formed in each diaphragm wall and consistent diameter circular welds in all of the inner and outer weld joints of the bellows.

With reference to FIG. 4, a preferred fixture useful in forming inside seams 81 is shown. This fixture generally indicated at 105 comprises a lower cylindrical block 106' having a screw threaded central hole 107 and a central retainer mandrel 108. In use, diaphragm leaves 100, 101 are positioned and clamped between a circular rim 109 screw threaded to tightly engage the inner portion of the diaphragm walls 100 and 101 biasing them against a raised collar 110 of the retainer block 106'. The centrally located threaded hole 107 is then mounted on a rotatable mandrel and the electron beam 103 applied in the work chamber of an electron beam machine so as to rotate the entire fixture 105 about a perfect circle and form a welded seam 81. After this, the central mandrel 108 is unscrewed and the two diaphragm walls are found to be hermetically sealed by the lapped joint 81. In production, a plurality of these fixtures are mounted in the work area (vacuum chamber) of the electron beam welder.

FIG. 5 discloses another fixture 120 comprising a central arbor 121 having a flat disc top 122 and a lower screw threaded spindle 123 with a disc clamp 124 held in place by a nut 125 locking a plurality of diaphragm walls which already have seams 81 formed therein in concentric position. Spacer blocks in cylindrical ring form, as shown at 126, space each of the seams to be formed allowing an electron beam 103 to form welds at the joints indicated. Here again, the spindle 123 is mounted on a rotatable member rotating at high concentricity so that a complete revolution of the device about the central axis of the arbor 121 permits high concentricity electron beam welds to be formed. This step shows formation of the outer seams 83. The electron beam 103 can be moved to lower it from one joint to the next when desired.

In a third step, the lower bellows header 57 is mounted in a rotatable chuck 130 with the bellows formed in the device of FIG. 5 positioned between the header and a rotatable clamp 131 in turn mounted on a fulcrum 132 rotatable in bearings 133 held in a stationary base block 134. A spacer ring such as a ring formed of copper as 126 in FIG. 5 spaces the joint between the header and the uppermost diaphragm wall from the next joint. An electron beam 103 is applied with the chuck then rotated to form a highly concentric electron beam weld joining the header 57 to the bellows.

In a next step, the clamp 131 is replaced by the upper header 55 and the attached connecting rod 16 with the electron beam applied at 103 to form the final electron beam weld completely about the lapped seam near the outer circumference. The hermetically sealed bellows 17 is then completely assembled.

Preferably, in all cases, the electron beam is applied at a right angle to the surface which is to be joined to an underlying diaphragm or at as near a right angle as possible in view of the physical limitations. Because of the use of electron beam welding, highly concentric welds are obtained in diaphragms formed of any desired materials including ferrous alloys, non-ferrous alloys, high nickel alloys, refractory metals, copper, aluminum and stainless steel. Moreover, the welds formed have substantially no increased material grain size thus maintaining the original strength of the material unlike other welding methods. The welds are formed at a slight distance from the normally punched inner and outer diameters of the diaphragm walls. The diameters have high concentricity as is known from conventional punching operations. The labeling used in FIGS. 4-6 uses the punched inner surfaces of the walls flush against a circular mandrel portion thus allowing precise location of the central axis of the bellows and precise rotation about the central axis. This is contrasted with conventional bead welding directly at the inner diameter which prevents usage of the surface at the inner diameter to act as a locating means during rotation to form hermetic seals.

While specific embodiments of this invention have been shown and described, it should be understood that many variations are possible. The important feature of the present invention relates to the use of lapped joints formed by electron beam welding with the joints having high concentricity and above all, minimized thickness at or below the total thickness of the walls being joined. While a compressor pump has been described, it should be understood that the device 10 can also be used as a vacuum pump merely be selecting the proper connections to the inlet and outlet ports, as known in the art.

We claim:
1. A gas pump comprising,
an electron beam welded bellows defining a compression chamber,
a reciprocating means for compressing and expanding said bellows,
a header means for permitting passage of gas into and out of said compression chamber,
said bellows comprising a plurality of thin metal, diaphragm walls,
said walls defining first and second continuous electron beam welded hermetic seams,
said seams being sealed together by an electron beam weld having a thickness substantially no greater than the thickness of said walls at said lapped seams,
said seams each have high concentricity about a central axis of said bellows with a TIR of no greater than 0.001,
said diaphragm walls have a thickness within the range of from 0.0005 to 0.030 inch,
said diaphragm walls having circular undulations in the form of a neuter diaphragm,
and said pump having a capacity in the range of from 0.01 cfm to 12 cfm.

* * * * *